No. 787,423. PATENTED APR. 18, 1905.
F. E. WOODWORTH.
FEEDING MECHANISM FOR SAWMILLS.
APPLICATION FILED MAY 16, 1904.
3 SHEETS—SHEET 3.
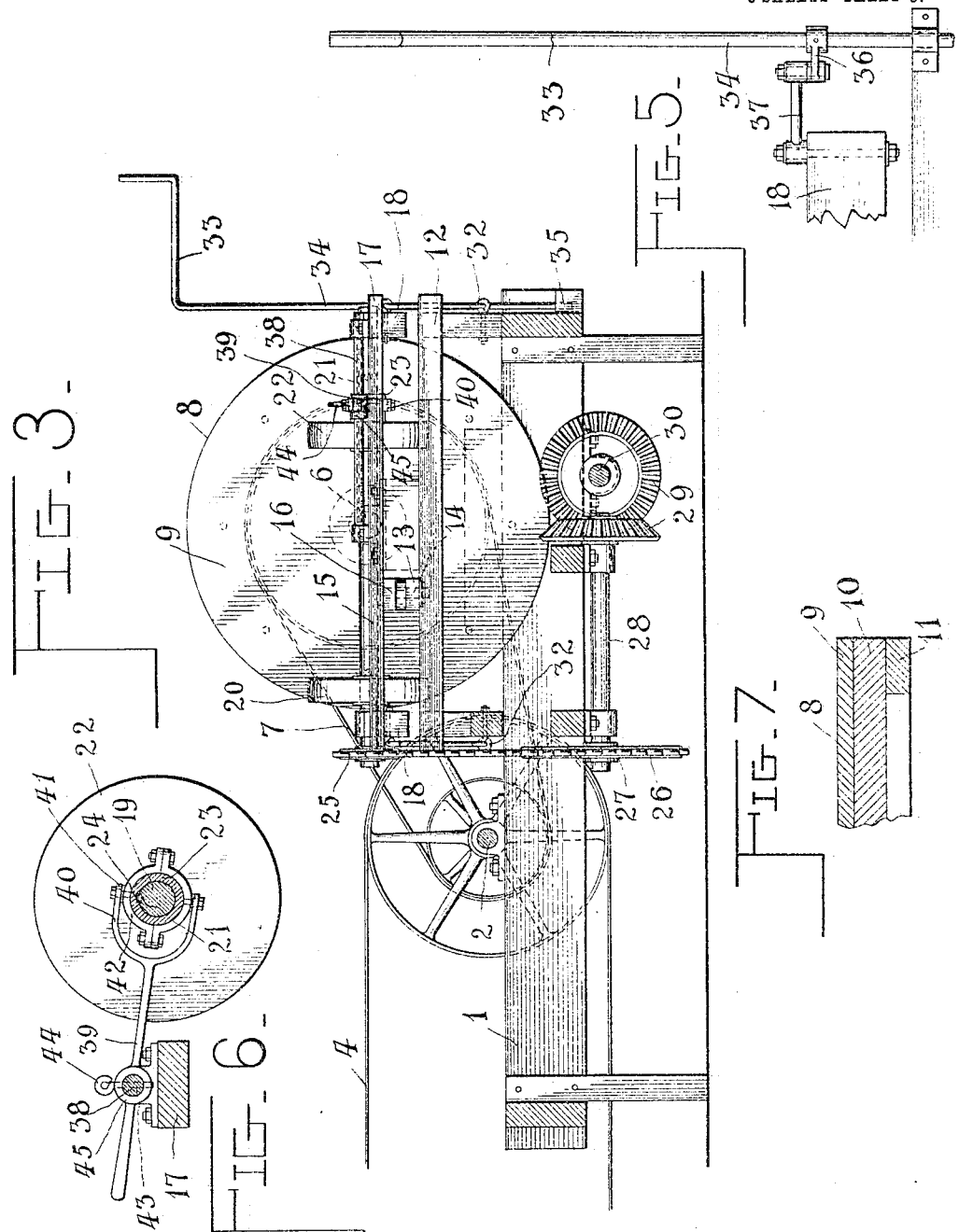
Witnesses:
Frederick E. Woodworth Inventor,
By Marion & Marion
Attorneys No. 787,423.

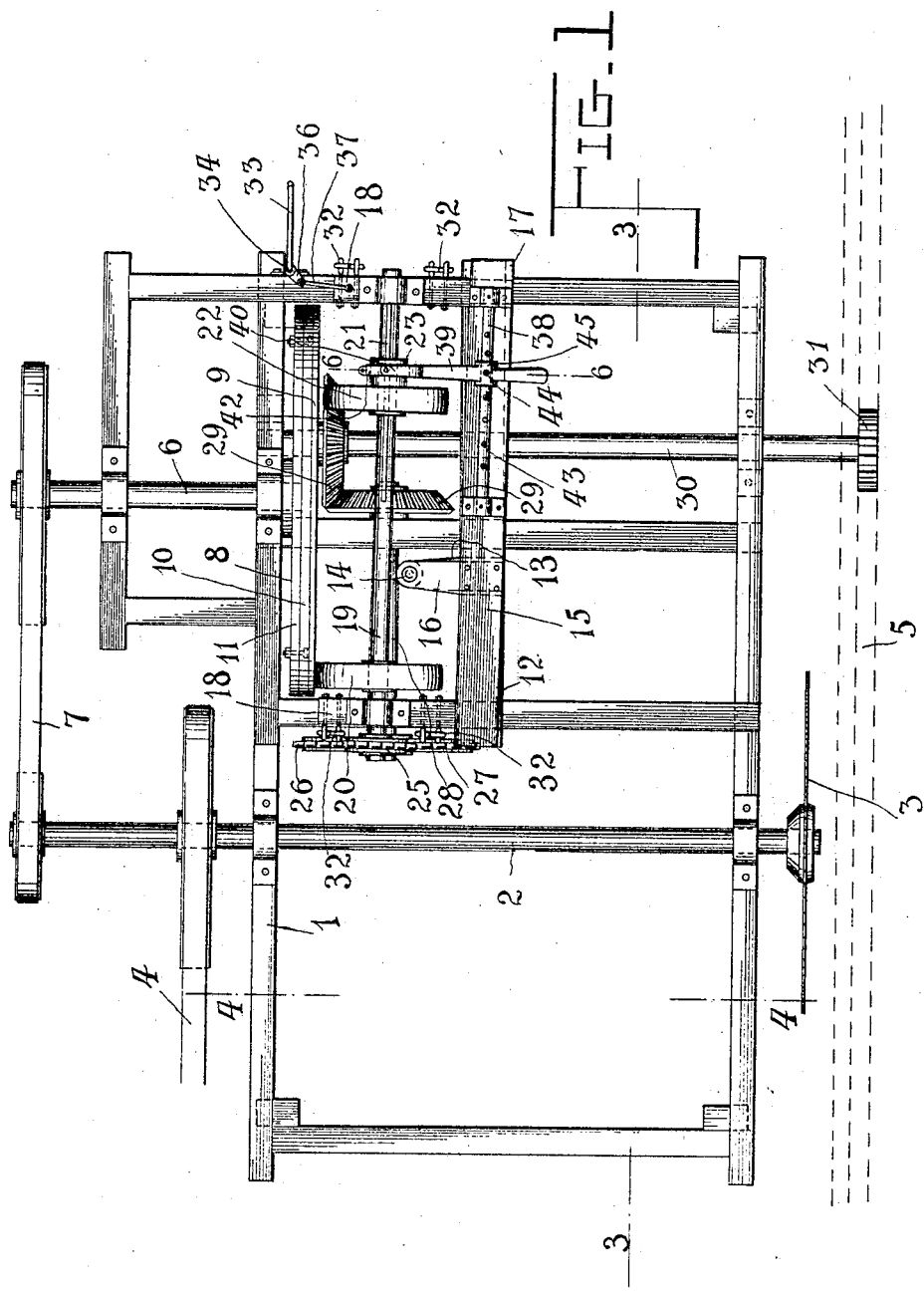

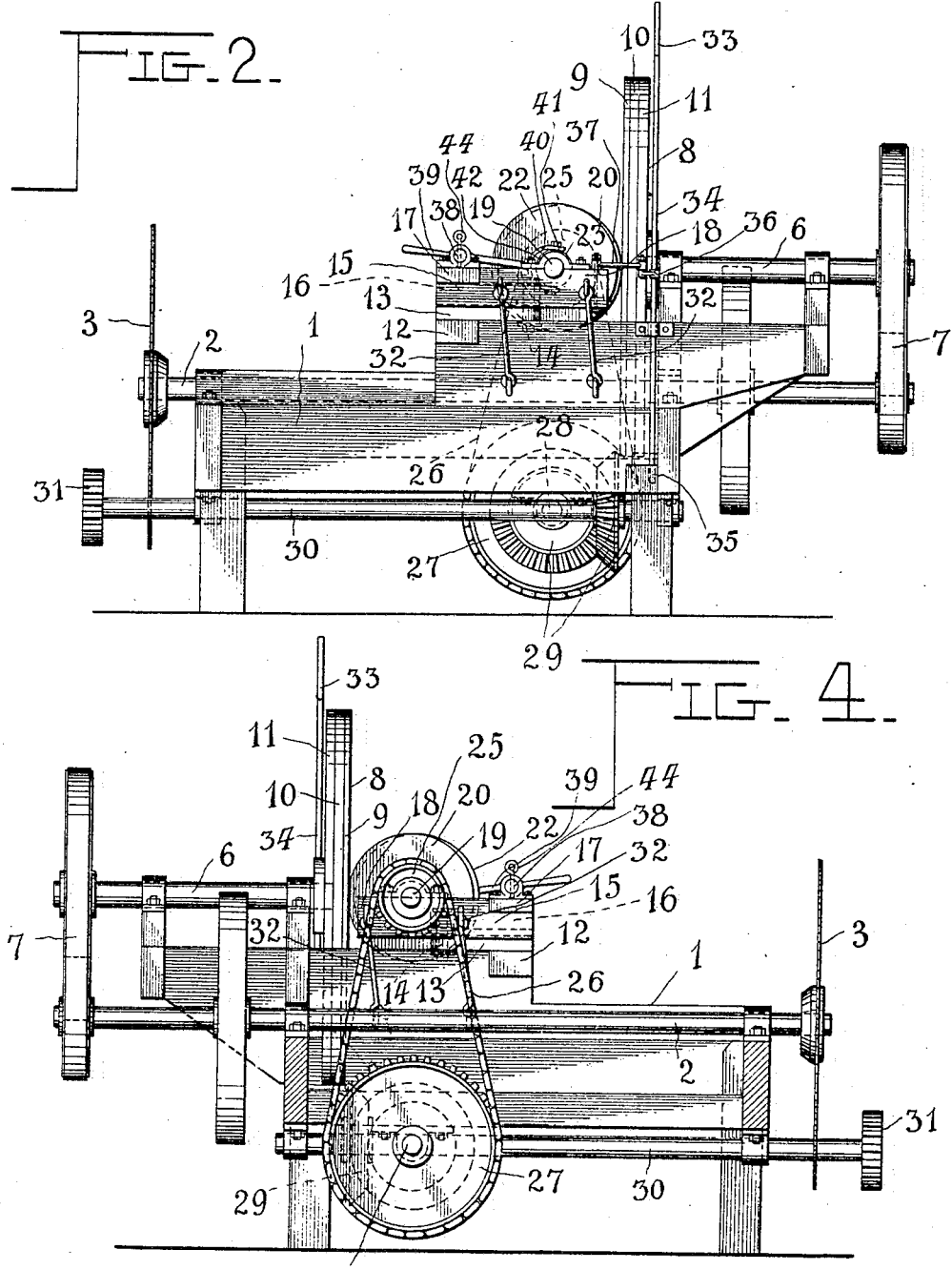

Patented April 18, 1905.

UNITED STATES PATENT OFFICE.

FREDERICK E. WOODWORTH, OF GRAFTON, CANADA.

FEEDING MECHANISM FOR SAWMILLS.

SPECIFICATION forming part of Letters Patent No. 787,423, dated April 18, 1905.

Application filed May 16, 1904. Serial No. 208,304.

*To all whom it may concern:*

Be it known that I, FREDERICK E. WOODWORTH, a subject of the King of Great Britain, residing at Grafton, county of Kings, in the Province of Nova Scotia, Canada, have invented certain new and useful Improvements in Feeding Mechanism for Sawmills; and I do hereby declare that the following is a full, clear, and exact description of the invention, such as will enable others skilled in the art to which it appertains to make and use the same.

My invention relates to feeding mechanism for sawmills, and especially to that type of mill in which a movable carriage advances a log past a continuously-rotating circular saw.

The object of the invention is to provide improved means for controlling the feed or speed of advance of the carriage and the timber carried thereby.

The invention contemplates the employment of a continuously-driven feed-wheel, the same consisting of a disk the face of which is adapted to drive either of a pair of rollers, the said rollers being attached to a shaft which is connected by suitable gearing with the feed-shaft of the mill. These rollers are located, respectively, on opposite sides of the axis of the feed-wheel, so that they may be driven thereby in different directions, and one of them is mounted so that it may roll upon the wheel at a greater or less distance from the axis thereof, in this way controlling its speed of rotation and that of the mechanism driven therefrom.

The invention consists in the construction and combination of parts, to be more fully described hereinafter and definitely set forth in the claims.

In the drawings, which fully illustrate my invention, Figure 1 is a plan of the feed mechanism of a mill constructed according to my invention. Fig. 2 is an end elevation representing the mechanism as viewed from the right of Fig. 1. Fig. 3 is a vertical section supposed to have been taken substantially on the line 3 3 of Fig. 1. Fig. 4 is a vertical section supposed to have been taken substantially on the line 4 4 of Fig. 1. Fig. 5 is a detail elevation, upon an enlarged scale, showing a portion of the operating mechanism for controlling the feed. Fig. 6 is a section, upon an enlarged scale, supposed to have been taken upon the line 6 6 of Fig. 1. Fig. 7 is a cross-section representing, upon an enlarged scale, a portion of the feed-wheel near the periphery thereof.

Throughout the drawings and specification the same numerals of reference denote like parts.

Referring more particularly to the parts, 1 represents a portion of the frame of the feed mechanism, the same being preferably built of timbers disposed substantially as shown. In this frame there is rotatably mounted a main shaft 2, carrying a circular saw 3, which is driven continuously through the medium of a belt 4, as will be readily understood. The said saw 3 is disposed, as shown, near the path 5 of a carriage which is adapted to support the timber to be cut. An auxiliary shaft 6 is rotatably mounted in the frame, the same being disposed substantially parallel with the shaft 2 and opposite one extremity thereof. This auxiliary shaft 6 is continuously driven through a belt 7, which leads from the main shaft 2, and at its extremity opposite the belt 7 it carries rigidly a feed-wheel 8, the same consisting substantially of an enlarged wheel or disk having a forward face or veneer 9, preferably of soft pine, and having a body 10 of some harder wood, but having a flange or binder-ring 11 disposed about the periphery of the body on the side opposite the face 9, as most clearly shown in Fig. 7.

The frame 1 comprises a cross-beam 12, which is disposed substantially parallel with the face of the feed-wheel 8, and this cross-beam has a forwardly-projecting arm 13. At 14 a feed-frame 15 is pivotally supported upon the arm 13, an arm 16, carried by the frame, being disposed above the arm 13, as shown, so that a body or beam 17 of the frame 15 lies substantially over the aforesaid beam 12. To the beam 17 lateral extensions 18 are attached, which constitute a portion of the frame 15, and in these extensions is rotatably mounted a feed-arbor 19. It should be understood that this arbor 19 is disposed transversely with respect to the axis of the feed-wheel 8, the middle point of the arbor being substantially upon the axis of the feed-wheel.

Near one extremity the arbor 19 carries rigidly a roller 20, the face whereof may be thrown into contact with the face of the feed-disk 8, as indicated in Fig. 1. From substantially its middle point the opposite extremity of the arbor 19 is provided with a longitudinally-disposed tongue 21, and upon this portion of the shaft there is slidably mounted a roller 22, which roller is substantially similar to the roller 20 aforesaid, which comprises a hub 23, having a longitudinal recess 24, which receives the aforesaid tongue 21 in such a manner as to enable the roller 22 to rotate with the arbor.

To the extremity of the arbor 19, adjacent to the roller 20, there is attached a sprocket-wheel 25, over which runs a chain 26, the lower portion whereof passes around a sprocket-wheel 27, which latter sprocket-wheel is rigidly carried upon a shaft 28, and this shaft, through the medium of bevel-gears 29, drives a feed-shaft 30, which shaft is disposed substantially parallel with the main shaft 2, as indicated, and carries a gear-wheel 31, which coöperates with a rack upon the carriage (not shown) for the purpose of advancing and returning the carriage.

It should be understood that the frame 15 may be tilted so that either the roller 20 or the roller 22 may come in contact with the face of the feed-wheel 8. In order to assist in supporting the frame 15, links 32 are provided at the extensions 18, preferably disposed substantially as shown, the lower extremities of the links being freely attached to the frame members adjacent to them. For the purpose of throwing the feed-frame 15 into either of its extreme positions a crank 33 is provided, the same having a vertical spindle 34, which is stepped at 35 and carries rigidly an arm 36, which arm connects, by means of a pitman 37, with one of the extensions 18, preferably near the inner extremity thereof. From this arrangement it should be understood that by throwing the crank 33 into either of its extreme positions the frame 15 may be thrown into either of its extreme positions. It should be further understood that as the rollers 20 and 22 are located on opposite sides of the axis of the feed-wheel 8 they will operate to drive the arbor 19 in the opposite direction, and in this connection it should be stated that the roller 20 is adapted to give the feed-shafts 30 such a direction of rotation as will return the carriage after a cut. As it is desirable to return the carriage at as high a speed as possible, this feed-roller 20 is located, preferably, near the periphery of the feed-wheel 8.

Arrangement is made for fixing the feed-roller 22 in different positions upon the arbor 19. For this purpose a guide-bar 38 is rigidly mounted upon the beam 17, the same being disposed parallel with the arbor 19. Upon this guide-bar 38 there is slidably mounted an adjusting-arm 39, the same terminating forwardly in a yoke 40, which attaches loosely at 41 to a collar 42, which collar is loosely mounted in a groove in the hub 23. From this arrangement evidently the arm 39 may move the roller 22 longitudinally upon the arbor. Arrangement is made for fixing the pulley 22 in different positions, the same consisting in providing a plurality of openings 43, which may receive a removable pin 44, passing through an opening in the head 45 of the arm 39.

The mode of operation of the mechanism is substantially as follows: The main belt 4 operates to drive the main shaft 2 continuously, which shaft carries the saw 3. From the main shaft the auxiliary shaft 6 is driven, the same carrying rigidly the feed-wheel 8, opposite to which the frame 15 is mounted. By operating the crank 33 either of the pulleys 20 or 22 may be thrown into contact with the face of the feed-wheel 8. When the feed-wheel 20 is in contact, the carriage will be returning, and when the feed-roller 22 is in contact the carriage will be advancing. By adjusting the arm 39 along the guide-bar 38 the position of the feed-roller 22 may be adjusted toward or away from the center of the feed-wheel 8, so that its velocity of rotation will be more or less, as desired.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim as new, and desire to secure by Letters Patent, is—

1. In a sawmill, in combination, a frame, a feed-wheel rotatably mounted thereupon, a feed-frame pivotally mounted upon said first frame, means for continuously driving said feed-wheel, an arbor rotatably mounted in said feed-frame, a feed-shaft, mechanism connecting said arbor with said feed-shaft for driving the latter, feed-rollers carried by said arbor the face whereof may engage the face of said feed-wheel, and means for moving said feed-frame upon the pivot thereof.

2. In a sawmill, in combination, a frame, a feed-wheel, means for continuously driving said feed-wheel, a feed-frame pivotally mounted upon said first frame, an arbor rotatably carried by said feed-frame, a feed-shaft, mechanism connecting said arbor with said feed-shaft for driving the latter, a feed-roller carried rigidly by said arbor, a second feed-roller slidably mounted upon said arbor and adapted to rotate therewith, means for adjusting the position of said last roller longitudinally upon said arbor, and means for moving said feed-frame upon the pivot thereof.

3. In a sawmill, in combination, a frame, a feed-wheel, means for continuously driving said feed-wheel, a feed-frame pivotally supported upon said first frame, an arbor carried rotatably by said feed-frame and disposed transversely of the face of said feed-wheel, feed-rollers carried by said arbor and adapted to contact with the face of said feed-wheel on opposite sides of the center thereof, a feed-shaft, means for driving said feed-shaft from said arbor, said last means including a flexible connection.

4. In a sawmill, in combination, a frame, a feed-wheel consisting substantially of a disk rotatably mounted in said frame, means for continuously driving said feed-wheel, a feed-frame pivotally mounted upon said first frame, said feed-frame having extensions disposed toward said feed-wheel, a feed-arbor rotatably mounted in said extension, links connecting said frame with said feed-frame, and constituting substantially a support for the latter, feed-rollers carried by said arbor respectively on opposite sides of the axis of said feed-wheel, said rollers being adapted to engage the face of said feed-wheel, means for tilting said feed-frame so as to engage either of said rollers with said feed-wheel, a feed-shaft, and means for driving the same from said arbor.

5. In a sawmill, in combination, a frame, a feed-wheel rotatably mounted therein, a feed-frame pivotally mounted upon said first frame, an arbor rotatably carried in said feed-frame, feed-rollers carried by said arbor and adapted to engage the face of said feed-wheel, a feed-shaft, a sprocket-wheel carried by said arbor, a sprocket-chain passing over said sprocket-wheel, and mechanism for driving said feed-shaft from said sprocket-chain.

In witness whereof I have hereunto set my hand in the presence of two witnesses.

FREDERICK E. WOODWORTH.

Witnesses:
B. BORDEN,
S. R. LANE.